G. D. EMERSON.
FRICTION CLUTCH FOR ENGAGING AND DISENGAGING GEARING.

No. 101,846. Patented Apr. 12, 1870.

Witnesses:
Kate N. Jones.
Jon. a Austin

Inventor:
Geo. D. Emerson.
Per J. Fraser & Co., atty

United States Patent Office.

GEORGE D. EMERSON, OF CALUMET, MICHIGAN.

Letters Patent No. 101,846, dated April 12, 1870; antedated April 4, 1870.

FRICTION-CLUTCH FOR ENGAGING AND DISENGAGING GEARING.

The Schedule referred to in these Letters Patent and making part of the same.

*To all whom it may concern:*

Be it known that I, GEORGE D. EMERSON, of Calumet, in the county of Houghton and State of Michigan, have invented a new and improved Friction-Clutch for Engaging and Disengaging Gearing, of which the following is a true description, reference being had to the accompanying drawings.

Figure 1:
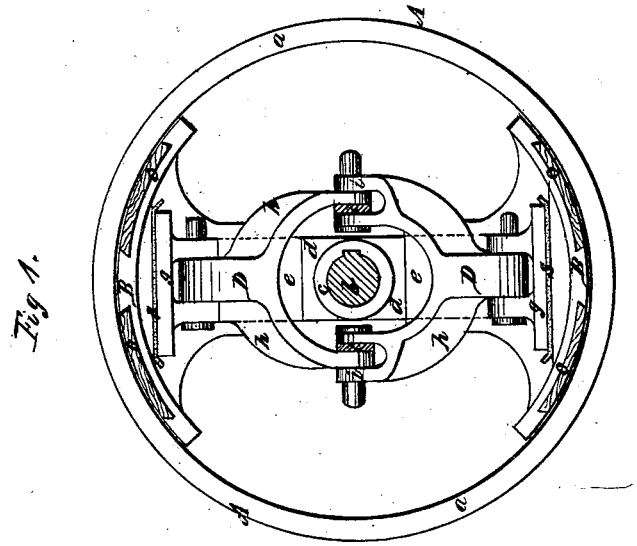

Figure 1 is a side view of a pulley-wheel with my device applied thereto.

Figure 2:
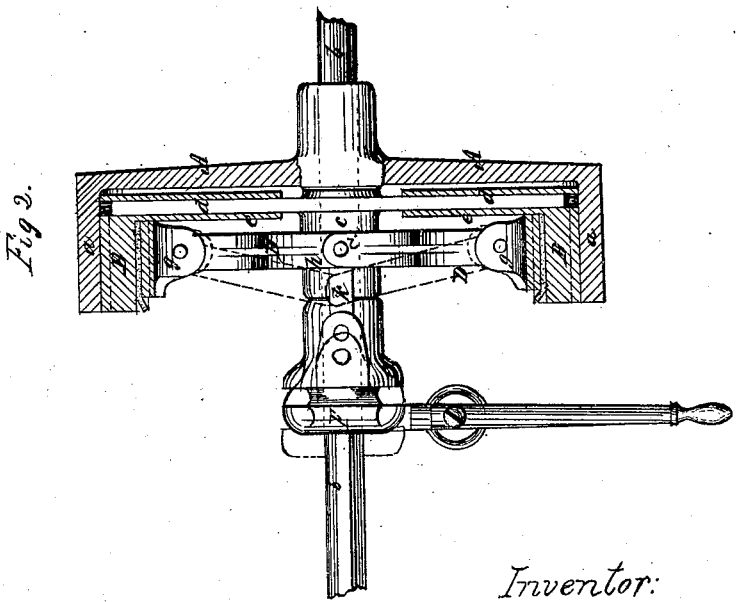

Figure 2, a vertical cross-section of the same.

Like letters of reference indicate corresponding parts in all of the figures.

My invention consists in the improved device herein described for producing the adjustment of the segment bearings, so that they may form a rigid connection with the pulley or gear wheel, or be disconnected therefrom at pleasure, for the purpose of engaging or disengaging the gearing of the machinery.

In the annexed drawings —

A indicates a loose pulley supported upon the shaft $b$.

The pulley A is made of the cup-form shown, having a projecting flange, $a$, that encases the interior mechanism.

Upon the shaft $b$ is rigidly secured a hub, $c$, which is provided with radially-projecting arms, $d\ d$, which support loosely the adjustable segments B B in ways or slots formed in the inwardly-projecting bearings $e\ e$ of the latter.

These segments are placed in close proximity with the flange $a$ of the loose pulley, and are adjusted out and in to form a rigid connection with the pulley, or to be disconnected therefrom by means of the toggle-levers D D, shown in figs. 1 and 2.

These toggle-levers are jointed to brackets $g\ g$ of the segments, situated on opposite sides of the pulley-wheel, and are formed with forked or branched arms, $h\ h$, which encircle the shaft $b$ and hub $c$, and are jointed to each other at $i\ i$.

At the joints $i\ i$ are also pivoted links or bars $k\ k$, which connect the levers with the sliding collar F, whereby the reciprocating movements are converted into the lateral, expanding, and contracting movements of the segments. The levers being jointed to each other, and not to the hub or collar, act reciprocally from the side of the pulley and entirely free of the shaft.

It will be seen that by simply adjusting the sliding collar F backward, the toggle-levers D D will necessarily be drawn out at an angle, and thereby the segment bearings be withdrawn from contact with the flange of the loose pulley A, as shown in red lines in fig. 2.

By this construction of the device for adjusting the segments, a more even and uniform pressure is obtained, and much less power is required than in other devices for the purpose.

I face these segments by inserting, in one or more dovetail recesses, blocks of wood, $o\ o$, which is better adapted for adhesion than if both surfaces were of metal, whereby the engagement is produced with less expenditure of power, and less strain from sudden stoppage of motion.

I prefer to employ an elastic packing or disk, $s$, of rubber or other suitable material, interposed between the brackets $g\ g$ and segments B, so as to allow a degree of elasticity to the segments to enable them to adapt themselves to the surface of the flange $a$, so as to secure an even bearing should there exist any inequality between the two friction-surfaces.

The special advantage of the interposed cushion $s$ is, that it enables the segments, when brought in contact with the flange of the pulley, to adapt themselves, in a measure, by the yielding of the cushion, to the irregularity between the two friction-surfaces, so that the adhesion may become quickly effective and prevent the shock of too suddenly overcoming the inertia of the non-revolving body.

The device is extremely simple, and hence the more durable and less liable to get out of order, while it is very effectual in its operation. This is due, in part, to the simple arrangement of the dual elbow-levers, jointed together to act independently of the sliding sleeve F, by which its motion is converted into a laterally expansive movement of the friction-segments, and the friction is communicated by their direct contact with the pulley to be engaged. This direct action, without the aid or interposition of other parts, produces another special advantage, in that, if one segment comes in contact with the flange $a$ before the other, the bearing thus obtained reacts directly against the opposite side, through the expansive movement of the other segment.

What I claim as my invention, and desire to secure by Letters Patent, is—

1. The combination, with the segments B B, sliding in the same line toward and from each other on arms $d\ d$, of the toggle-levers D D, jointed to said segments and operating together, substantially as described.

2. In combination with the expanding segments B B and toggle-levers D D, the elastic disks $s\ s$, for the purpose set forth.

3. The segments B B, in combination with the wooden facings $o\ o$, operating substantially as set forth and described.

GEO. D. EMERSON.

Witnesses:
KATE N. JONES,
J. FRASER.